United States Patent
Sultenfuss et al.

(10) Patent No.: US 10,013,026 B2
(45) Date of Patent: Jul. 3, 2018

(54) METHOD AND SYSTEM FOR AUTO CALIBRATION OF DISPLAY USING AMBIENT LIGHT SENSORS

(71) Applicant: Dell Products L.P., Round Rock, TX (US)

(72) Inventors: Andrew Thomas Sultenfuss, Leander, TX (US); Stefan Peana, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 132 days.

(21) Appl. No.: 13/721,432

(22) Filed: Dec. 20, 2012

(65) Prior Publication Data
US 2014/0176444 A1 Jun. 26, 2014

(51) Int. Cl.
*G06F 1/16* (2006.01)

(52) U.S. Cl.
CPC .......... *G06F 1/1637* (2013.01); *G06F 1/1677* (2013.01); *G09G 2320/0666* (2013.01); *G09G 2320/0693* (2013.01); *G09G 2360/145* (2013.01)

(58) Field of Classification Search
CPC .......... G06F 3/041; G06F 3/02; G06F 1/1637; G06F 1/1677; G09G 2320/0693; G09G 2320/0242; G09G 2320/043; G09G 2320/00; G09G 2320/04; G09G 2320/0666; G09G 2360/145
USPC .............. 345/168–178, 207; 340/540, 693.6, 340/815.5
See application file for complete search history.

(56) References Cited

U.S. PATENT DOCUMENTS

| | | | |
|---|---|---|---|
| 5,969,756 A | 10/1999 | Buckley et al. | |
| 7,602,371 B2 | 10/2009 | Sultenfuss et al. | |
| 2004/0114344 A1* | 6/2004 | Burtsev | G02B 6/0001 362/604 |
| 2006/0181552 A1* | 8/2006 | Hopple | G09G 3/20 345/690 |
| 2007/0024576 A1* | 2/2007 | Hassan | 345/156 |
| 2008/0246606 A1* | 10/2008 | Smith et al. | 340/540 |
| 2008/0248837 A1* | 10/2008 | Kunkel | 455/566 |
| 2008/0309682 A1* | 12/2008 | Lee et al. | 345/690 |
| 2009/0160878 A1* | 6/2009 | Kwong et al. | 345/690 |
| 2009/0184947 A1* | 7/2009 | Hupman et al. | 345/207 |
| 2009/0303200 A1* | 12/2009 | Grad | 345/173 |
| 2010/0128064 A1 | 5/2010 | Taylor et al. | |
| 2010/0207911 A1* | 8/2010 | Newton | 345/175 |

(Continued)

*Primary Examiner* — Abhishek Sarma
(74) *Attorney, Agent, or Firm* — Winstead PC (57) ABSTRACT

An information handling system having a first housing, a second housing interoperably coupled to the first housing and movable relative to the first housing between an open configuration and a closed configuration, and a sensor integrated with a housing of the first housing and the second housing. A display integrated with the same housing of the first housing and the second housing as the sensor and a light guide integrated with a different housing of the first housing and the second housing from the sensor, the light guide having an input and an output. In the closed configuration, the input faces a portion of the display and channels light having display attributes from the display to the output and the sensor is at least partially aligned with the output and receives at least some of the channeled light.

18 Claims, 10 Drawing Sheets

(56) References Cited

U.S. PATENT DOCUMENTS

| | | | |
|---|---|---|---|
| 2011/0087990 A1* | 4/2011 | Ng | G06F 3/04886 715/773 |
| 2011/0157029 A1* | 6/2011 | Tseng | G06F 3/04883 345/173 |
| 2011/0273413 A1* | 11/2011 | Woestenborghs | G02F 1/133603 345/207 |
| 2012/0241297 A1 | 9/2012 | Prsa et al. | |
| 2013/0044506 A1* | 2/2013 | Chen | 362/556 |
| 2013/0275907 A1* | 10/2013 | Lau | G06F 3/04886 715/773 |

* cited by examiner

METHOD AND SYSTEM FOR AUTO CALIBRATION OF DISPLAY USING AMBIENT LIGHT SENSORS

BACKGROUND OF THE INVENTION

Technical Field

The present invention relates generally to information handling systems and more particularly, but not by way of limitation, to methods and systems for calibrating a display of an information handling system.

History of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include a display. Conventional displays include backlights that are used to produce images that are displayed on the display. Typically, these backlights have a number of different devices such as, for example, Cold Cathode Fluorescent Lighting (CCFL) or White Light Emitting Devices (WLEDs). However, there has recently been a shift to the use of Red, Green, and Blue Light Emitting Devices (RGB LEDs) to provide the backlights, as RGB LED backlights maintain equivalent or lower power consumption relative to CCFL backlights when used in high color gamut displays and provide a superior viewing experience by offering a high color gamut at over 90% as compared to 72% with a CCFL or 42% with a WLED.

SUMMARY OF THE INVENTION

An information handling system having a first housing, a second housing interoperably coupled to the first housing and movable relative to the first housing between an open configuration and a closed configuration, and a sensor integrated with a housing of the first housing and the second housing. A display integrated with the same housing of the first housing and the second housing as the sensor and a light guide integrated with a different housing of the first housing and the second housing from the sensor, the light guide having an input and an output. In the closed configuration, the input faces a portion of the display and channels light having display attributes from the display to the output and the sensor is at least partially aligned with the output and receives at least some of the channeled light.

A method of calibrating a display of an information handling system. The method includes coupling a first housing with a second housing, wherein the first housing and the second housing are movable between an open configuration and a closed configuration, integrating a sensor with a housing of the first housing and the second housing, and integrating a display with the same housing of the first housing and the second housing as the sensor. The method also includes integrating a light guide with a different housing of the first housing and the second housing from the sensor, the light guide comprising an input and an output. In the closed configuration, the input faces a portion of the display and channels light having display attributes from the display to the output and the sensor is at least partially aligned with the output and receives at least some of the channeled light.

A display-calibration method. The method includes disposing a display integrated with a first housing with an input of a light guide integrated with a second housing. At least partially aligning a sensor integrated with the first housing with an output of the light guide, the input receiving light having display attributes from the display, the light guide channeling at least some of the received light to the output, the sensor receiving at least some of the channeled light from the output, and forwarding, by the sensor to processing circuitry, data for use in calibration of the display.

BRIEF DESCRIPTION OF THE DRAWINGS

A more complete understanding of the method and system of the present invention may be obtained by reference to the following Detailed Description when taken in conjunction with the accompanying Drawings wherein.

DESCRIPTION OF THE EXEMPLARY EMBODIMENTS

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Controlling the color of the display that uses RGB LED backlights raises a number of issues. Conventionally, an RGB LED backlit display is manufactured with fixed gamma voltages, color filter, and backlight, which creates a defined and fixed color palette for the display. In order to control the color of the display after manufacture, a data manipulation technique is performed where display data is altered through the use of algorithms or look up tables to produce a re-mapping of data points on the color palette to achieve a desired color for a given set of display data that would not otherwise be produced according to the fixed color palette created during manufacture.

Figure 1A:
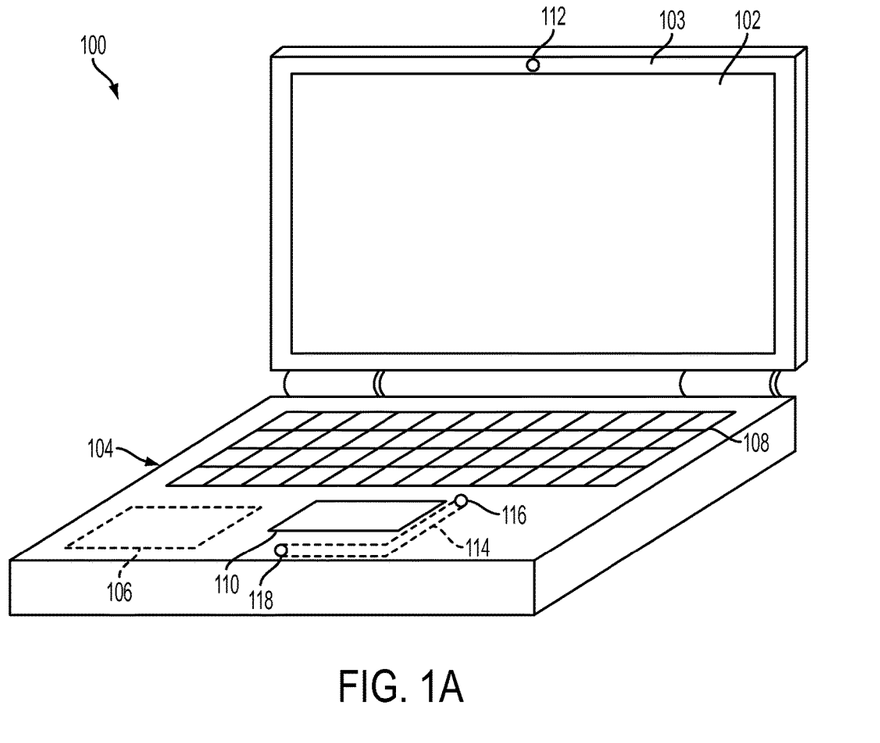
FIG. 1A illustrates an information handling system.

FIG. 1A illustrates an information handling system. The information handling system 100 is configured as a portable system and includes a first housing 103 and a second housing 104. The first housing 103 and the second housing 104 are interconnected through a pivot that allows opening and closing of the information handling system 100. In a typical embodiment, the first housing 103 may function as, for example, a lid or a cover of the information handling system 100. The first housing 103 includes a display 102 and a sensor 112 embedded therein.

In a typical embodiment, the sensor 112 may be, for example, an ambient light and color sensor(s). The sensor 112 is configured to measure multiple attributes of the display 102 such as, for example, one or more of color, contrast, saturation, hue, brightness levels, and other display attributes. The information handling system 100 further includes processing circuitry 106, a light guide 114, and user input/output devices such as, for example, a keyboard 108, and a touchpad 110. The processing circuitry 106, the light guide 114, the keyboard 108, and the touchpad 110 are typically integrated with the second housing 104. In a typical embodiment, the display 102 may be any type of visual input/output configured to display one or more characters and/or receive input corresponding to one or more characters. In addition, the display 102 may be configured to display, for example, diagrams, pictures, words, characters, and the like. The display 102 may further be configured to receive input corresponding to one or more diagrams, pictures, words, characters, and the like. In some embodiments, the display 102 may be, for example, a touch-screen display and may be configured to display respective representations of the keyboard 108 (e.g., a virtual keyboard).

The light guide 114 includes a light guide input 116 and a light guide output 118. The light guide 114 is configured such that, when the information handling system 100 is in a closed configuration (i.e., the first housing 103 is closed), the light guide input 116 faces at least a portion of the display 102 and channels light having display attributes, such as, for example, one or more of color, contrast, saturation, hue, and brightness levels via the light guide 114 to the light guide output 118.

In a typical embodiment, the light guide 114 may be made of, for example, a material having good transmittance in a visible light region, thereby allowing light having display attributes to be channeled through the light guide 114. For example, the light guide 114 may be made of any material that allows sufficient intensity of light rays to pass within the light guide 114. In a typical embodiment, the light guide 114 may be made of, for example, plastic. In some embodiments, the light guide 114 may be made of, for example, Acrylonitrile Butadiene Styrene (ABS), polypropylene, styrene, and the like.

In FIG. 1A, the light guide 114 is disposed within the second housing 104 adjacent the touchpad 110. In some embodiments, the light guide 114 may be disposed at other locations within the second housing 104. For example, the light guide 114 may be disposed within the second housing 104 adjacent the touchpad 110 in an opposite orientation to the one illustrated in FIG. 1A. In other embodiments, the light guide 114 may be portable and may not be disposed in the second housing 104.

In a typical embodiment, the sensor 112 and the light guide output 118 are configured such that the sensor 112 and the light guide output 118 are partially aligned when the information handling system 100 is in the closed configuration. As such, the sensor 112 is able to measure display attributes 402 received from the display 102 by the light guide output 116 (See FIG. 4B). Once the sensor 112 completes the measuring process, adjustment data is transmitted to the processing circuitry 106 to initiate calibration of the display 102.

Figure 1B:
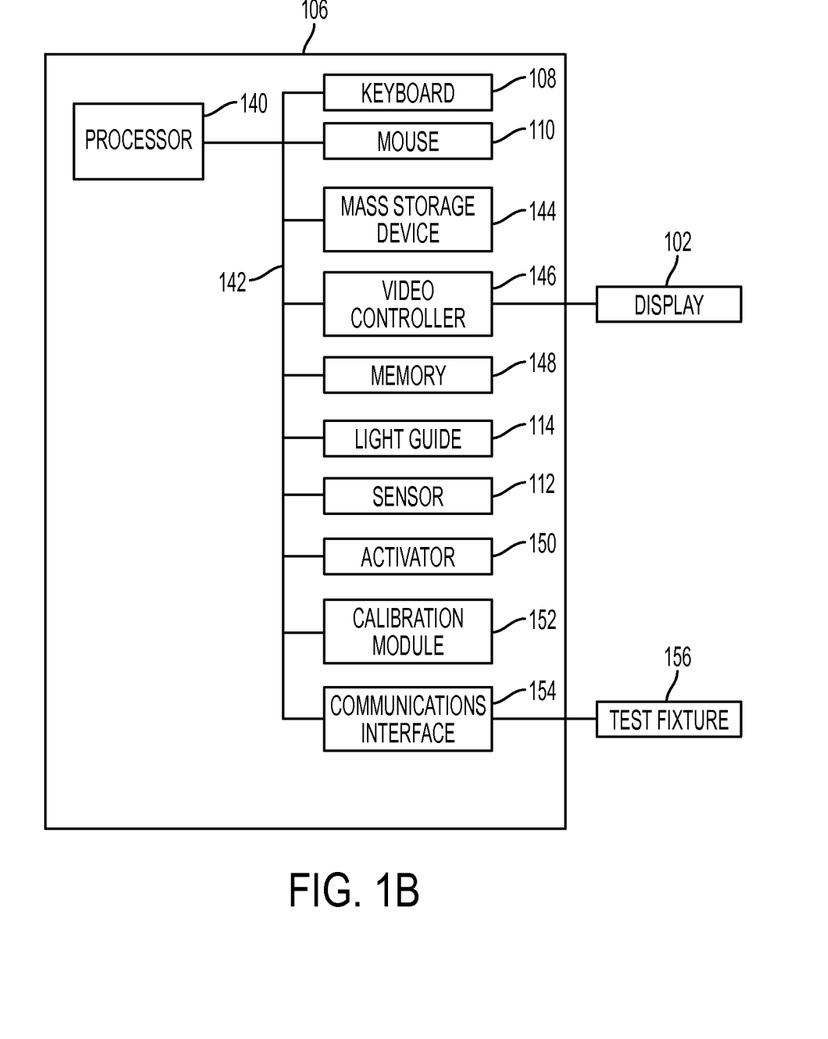
FIG. 1B is a schematic view illustrating processing circuitry of the information handling system.

FIG. 1B is a schematic view illustrating processing circuitry of the information handling system 100. The processing circuitry 106 includes a processor 140 connected to a bus 142. The bus 142 serves as a connection channel between the processor 140 and various other components of the information handling system 100. User input/output devices such as, for example, the keyboard 108 and the touchpad 110, are coupled to the processor 140. Further examples of input/output devices may include touchscreens, pointing trackballs, trackpads, and a variety of other input/output devices. Programs and data are stored on a mass storage device 144, coupled to the processor 140. Examples of the mass storage device 144 may include, for example, hard discs, optical disks, magneto-optical discs, solid-state storage devices, and a variety of other mass storage devices.

The display 102 is coupled to the processor 140 by a controller 146. A system memory 148 is coupled to the processor 140 to provide the processor 140 with fast storage to facilitate execution by the processor 140. Examples of system memory 148 may include, for example, random access memory (RAM) devices such as dynamic RAM (DRAM), synchronous DRAM (SDRAM), solid state memory devices, and a variety of other memory devices. The sensor 112 and the light guide 114 are coupled to the processor 140 and provide information regarding display attributes, such as, for example, one or more of color, contrast, saturation, hue, and brightness levels to the processor 140.

The processing circuitry 106 also includes an activator 150. In a typical embodiment, the activator 150 may be, for example, a calibration activator. The activator 150 is configured to initiate a calibration process. The activator 150 may be, for example, a button, a keyboard key, or an application or program for initiating calibration of the display 102. The processing circuitry 106 also includes a calibration module 152 that is configured to calibrate the display 102. The processing circuitry 106 also includes a communications interface 154 that couples a test fixture 156 to the processor 140. The test fixture 156 is configured to provide information regarding display attributes, such as, for example, one or more of color, contrast, saturation, hue, and brightness levels to the processor 140. In a typical embodiment, the display calibration may be performed based on, for example, adjustment data from the sensor 112. In other embodiments, the display calibration may be performed based on, for example, adjustment data from the sensor 112 and information from the test fixture 156. The display calibration may include taking into account at least one of external conditions (e.g., ambient light), internal conditions (e.g., current display color and backlight), base calibration values, adjustment data from the sensor 112, and information from the test fixture 156. The base calibration values may be obtained via, for example, an external display calibration tool or factory calibration set-up.

In a typical embodiment, one or both of the first housing 103 and the second housing 104 incorporates components of the information handling system 100. It should be understood that other buses and intermediate circuits can be deployed between the components described above and processor 140 to facilitate interconnection between the components and the processor 140.

Figure 1C:
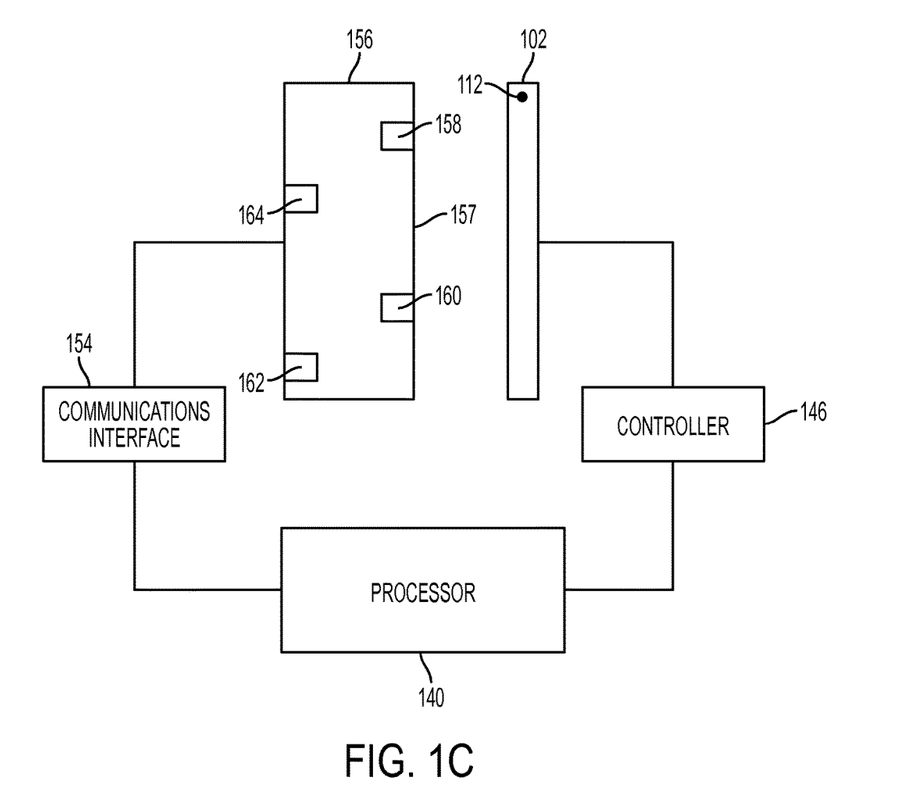
FIG. 1C illustrates a test fixture for a display of the information handling system.

FIG. 1C illustrates a test fixture 156 for the display 102 of the information handling system 100. In a typical embodiment, the test fixture 156 is positioned in front of the display 102 of the information handling system 100. The test fixture 156 includes a frame 157 supporting a plurality of sensors 158, 160, 162, 164. The plurality of sensors 158, 160, 162, 164 are configured to measure display attributes, such as, for example, one or more of color, contrast, saturation, hue, and brightness levels corresponding to images displayed on the display 102 and provide information regarding the display attributes, to the processor 140 via the communications interface 154. In a typical embodiment, the display calibration may be performed based on, for example, adjustment data from the sensor 112. In other embodiments, the display calibration may be performed based on, for example, adjustment data from the sensor 112 and information from the test fixture 156. The processor 140 initiates display calibration taking into account at least one of external conditions (e.g., ambient light), internal conditions (e.g., current display color and backlight), base calibration values, adjustment data from the sensor 112, and information from plurality of sensors 158, 160, 162, 164 of the test fixture 156.

Figure 2A:
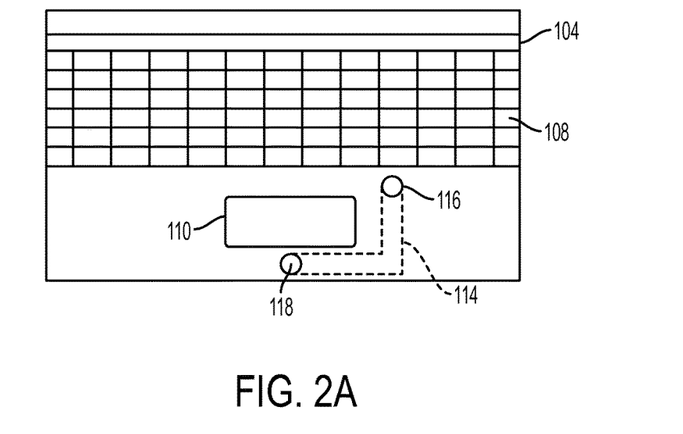
FIG. 2A is a top view illustrating a second housing of the information handling system.

FIG. 2A is a top view illustrating the second housing 104 of the information handling system 100. The light guide 114, the keyboard 108, and the touchpad 110 are integrated with the second housing 104. The light guide 114 includes the light guide input 116 and the light guide output 118. In a typical embodiment, the light guide 114 is made of, for example, a material having good transmittance in the visible light region, thereby allowing light to be channeled through the light guide 114. In FIG. 2A, the light guide 114 is disposed within the second housing 104 adjacent the touchpad 110. The light guide 114 is configured such that, when the information handling system 100 is in the closed configuration, the light guide input 116 faces at least a portion of the display 102 and channels light having display attributes, such as, for example, one or more of color, contrast, saturation, hue, and brightness levels via the light guide 114 to the light guide output 118. In other embodiments, the light guide 114 may be portable and may not be disposed in the second housing 104.

Figure 2B:
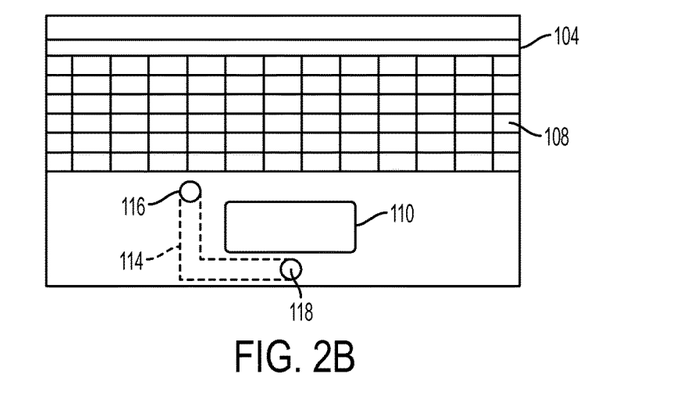
FIG. 2B is a top view illustrating a second housing of the information handling system.

FIG. 2B is a top view illustrating the second housing 104 of the information handling system 100 according to another embodiment. In FIG. 2B, the light guide 114 is disposed within the second housing 104 adjacent the touchpad 110 in an opposite orientation to the one illustrated in FIG. 2A. In other embodiments, the light guide 114 may be portable and may not be disposed in the second housing 104.

Figure 2C:
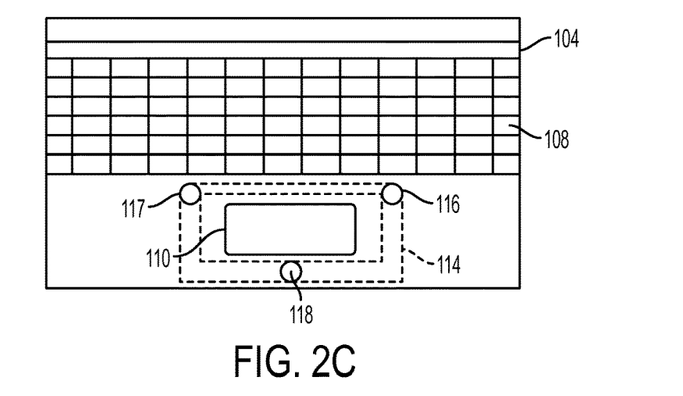
FIG. 2C is a top view illustrating a second housing of the information handling system.

FIG. 2C is a top view illustrating a second housing 104 of the information handling system 100 according to another embodiment. The light guide 114, the keyboard 108, and the touchpad 110 are integrated with the second housing 104. The light guide 114 includes a first light guide input 116, a second light guide input 117, and a light guide output 118. In a typical embodiment, the light guide 114 is made of, for example, a material having good transmittance in the visible light region, thereby allowing light to be channeled through the light guide 114. In FIG. 2C, the light guide 114 is disposed with the second housing 104 around a perimeter of the touchpad 110. The light guide 114 is configured such that, when the information handling system 100 is in a closed configuration, the light guide inputs 116 and 117 face at least a portion of the display 102 and channel light having display attributes, such as, for example, one or more of color, contrast, saturation, hue, and brightness levels via the light guide 114 to the light guide output 118. In other embodiments, the light guide 114 may be portable and may not be disposed in the second housing 104.

Figure 2D:
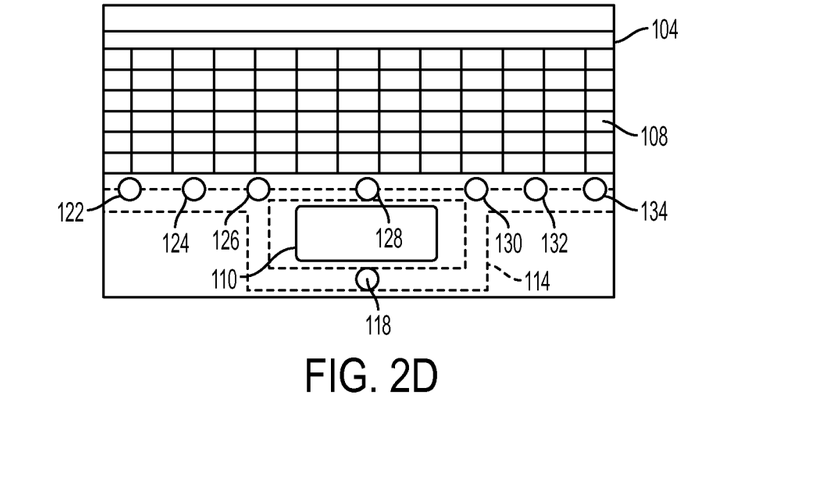
FIG. 2D is a top view illustrating a second housing of the information handling system.

FIG. 2D is a top view illustrating a second housing 104 of the information handling system 100 according to another embodiment. The light guide 114, the keyboard 108, and the touchpad 110 are integrated with the second housing 104. The light guide 114 includes a plurality of light guide inputs 122, 124, 126, 128, 130, 132, 134, and a light guide output 118. In a typical embodiment, the light guide 114 is made of, for example, a material having good transmittance in the visible light region, thereby allowing light to be channeled through the light guide 114. In FIG. 2D, the light guide 114 is disposed with the second housing 104 below the keyboard 108. The light guide 114 is configured such that, when the information handling system 100 is in a closed configuration, the light guide inputs 122, 124, 126, 128, 130, 132, 134 face at least a portion of the display 102 and channel light having display attributes, such as, for example, one or more of color, contrast, saturation, hue, and brightness levels via the light guide 114 to the light guide output 118. In FIG. 2D, the light guide 114 comprises seven light guide inputs 122, 124, 126, 128, 130, 132, 134; however, in other embodiments, the light guide 114 may include any number of light guide inputs depending on design requirements. In other embodiments, the light guide 114 may be portable and may not be disposed in the second housing 104.

Figure 2E:
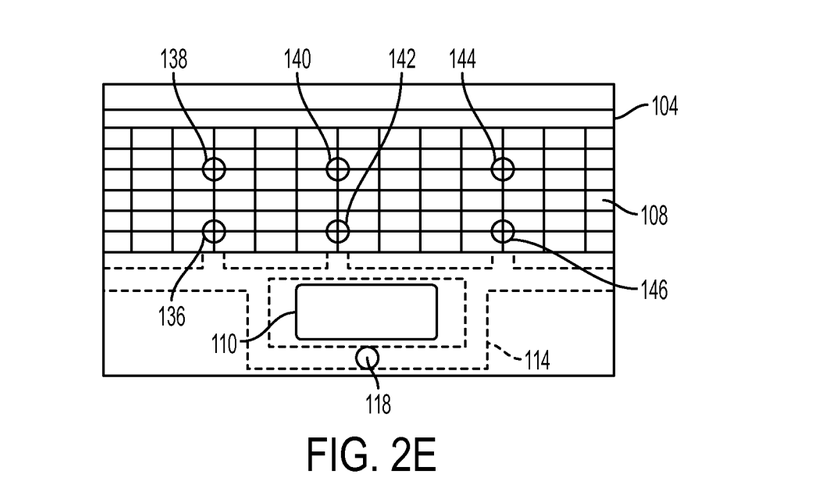
FIG. 2E is a top view illustrating a second housing of the information handling system.

FIG. 2E is a top view illustrating a second housing 104 of the information handling system 100 according to another embodiment. The light guide 114, the keyboard 108, and the touchpad 110 are integrated with the second housing 104. The light guide 114 includes a plurality of light guide inputs 136, 138, 140, 142, 144, 146, and a light guide output 118. In a typical embodiment, the light guide 114 is made of, for example, a material having good transmittance in the visible light region, thereby allowing light to be channeled through the light guide 114. In FIG. 2E, the light guide 114 is disposed with the second housing 104 at various locations between keys of the keyboard 108. The light guide 114 is configured such that, when the information handling system 100 is in a closed configuration, the light guide inputs 136, 138, 140, 142, 144, 146 face at least a portion of the display 102 and channel light having display attributes, such as, for example, one or more of color, contrast, saturation, hue, and brightness levels via the light guide 114 from active zones of the display 102 to the light guide output 118. In FIG. 2E, the light guide 114 comprises six light guide inputs 136, 138, 140, 142, 144, 146; however, in other embodiments, the light guide 114 may include any number of light guide inputs depending on design requirements. In other embodiments, the light guide 114 may be portable and may not be disposed in the second housing 104.

Figure 3:
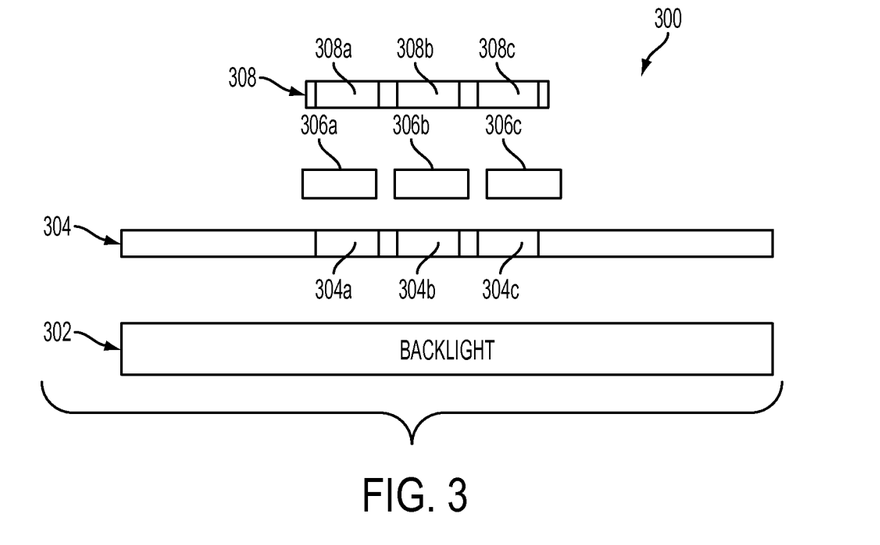
FIG. 3 is a schematic view of illustrating a display cell.

FIG. 3 is a schematic view of a display cell. The display 102 may be a liquid crystal display (LCD) that includes a cell 300 that may be an LCD cell. The cell 300 includes a backlight 302 that may include, for example, an RGB LED backlight. A shutter 304 is located adjacent the backlight 302 and includes a plurality of shutter members 304a, 304b, and 304c that are operable to control an amount of light from the backlight 302 that passes through the shutter 304. A plurality of color filters 306a, 306b and 306c are located adjacent the shutter members 304a, 304b and 304c, respectively, on the shutter 304 and are operable to filter white light that passes through the shutter 304 from the backlight 302 to create red, green, and blue light, respectively. A pixel 308 includes a plurality of pixel members 308a, 308b and 308c that are located adjacent the color filters 306a, 306b and 306c, respectively, and are operable to allow the filtered light (e.g., red light for the pixel member 308a, green light for the pixel member 308b, and blue light for the pixel member 308c) to be displayed by the display 102.

Conventionally, the display 102 is manufactured with fixed gamma voltages, color filter, and backlight, to create a fixed color palette. To produce a color on the display 102, the backlight 302 is activated to create white light from the RGB LEDs, each of whose intensity is fixed during the manufacture of the display 102. The white light passes through the shutter 304 to the color filters 306a, 306b and 306c, creating red, green and blue light that may exit the pixel 308. The colors displayed on the display 102 (FIG. 1A) may autonomously change during the operation of the information handling system 100 or in the course of time. For example, the display 102 may display visual elements having incorrect colors that need to be corrected.

Figure 4A:
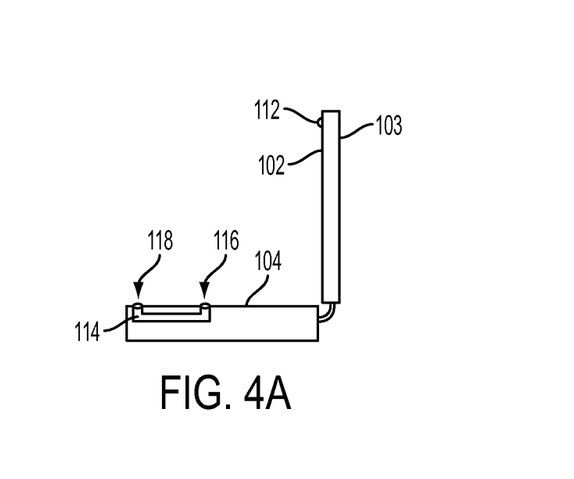
FIG. 4A is a side view of the information handling system in an open configuration.
Figure 4B:
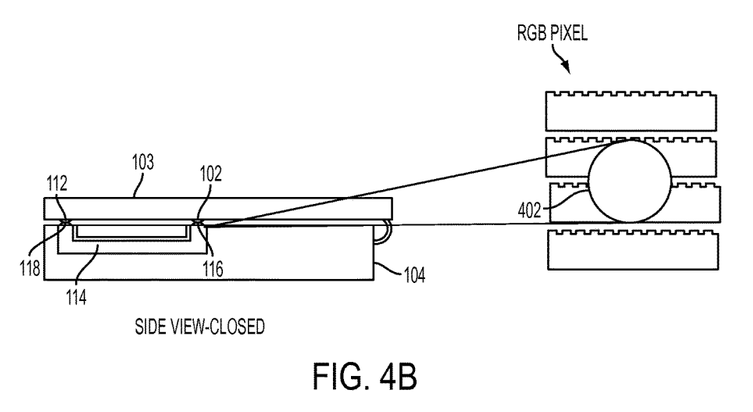
FIG. 4B is a side view of the information handling system in a closed configuration.

FIG. 4A is a side view of the information handling system 100 in the open configuration. FIG. 4B is a side view of the information handling system 100 in the closed configuration. The light guide 114 is configured such that, when the information handling system 100 is in the closed configuration, the light guide input 116 faces at least a portion of the display 102 and channels light having display attributes 402, such as, for example, one or more of color, contrast, saturation, hue, and brightness levels via the light guide 114 to the light guide output 118. In a typical embodiment, the sensor 112 and the light guide output 118 are configured such that the sensor 112 and the light guide output 118 are partially aligned when the information handling system 100 is in the closed configuration. The sensor 112 is able to measure display attributes 402. Once the sensor 112 completes the measuring process, adjustment data is transmitted to the processing circuitry to initiate calibration of the display 102. In a typical embodiment, the display calibration may be performed based on, for example, adjustment data from the sensor 112. The display calibration may include taking into account external conditions (e.g., ambient light), internal conditions (e.g., current display color and backlight), and base calibration values. The base calibration values may be obtained via, for example, an external display calibration tool or factory calibration set-up.

Referring now to FIGS. 1A-4B, calibration of the display 102 will now be discussed. In a typical embodiment, the sensor 112 and the light guide output 118 are configured such that the sensor 112 and the light guide output 118 are partially aligned when the information handling system 100 is in the closed configuration. In the closed configuration, the light guide input 116 faces at least a portion of the display 102 and channels light display attributes, such as, for example, one or more of color, contrast, saturation, hue, and brightness levels via the light guide 114 to the light guide output 118. In addition, when the information handling system 100 is in the closed configuration, the sensor 112 is activated by the activator 150. In the activated state, the sensor 112 detects and measures light having display attributes from the light guide output 118. For example, the sensor 112 may measure, for example, one or more of color, contrast, saturation, hue, and brightness levels of the display 102. The sensor 112 provides adjustment data to the processing circuitry 106 to initiate calibration of the display 102 which is performed by the calibration module 152. The calibration of the display 102 is based on the adjustment data from the sensor 112. In addition, the intensity of the RGB LEDs is also adjusted to compensate for LED performance due to, for example, temperature sensitivity or aging, based on the adjustment data from the sensor 112.

According to some embodiments, the activator 150 may be programmed such that the activator 150 activates the sensor 112 to initiate the calibration process, for example, in response to the information handling system 100 being in the closed configuration (e.g., the first housing 103 being closed). In some embodiments, the activator 150 may be programmed such that the activator 150 activates the sensor 112 to initiate the calibration process, for example, in response to the first housing 103 of the information handling system 100 being closed a predetermined number of times. For example, the activator 150 may be programmed such that the activator 150 activates the sensor 112 to initiate the calibration process every fifth time the information handling system 100 is in the closed configuration.

In the embodiment illustrated in FIG. 1A, the sensor 112 is disposed in an upper portion of the first housing 103 towards a center of the display 102. However, in some embodiments, the sensor 112 may be disposed at any suitable location in the first housing 103 such that the sensor 112 partially aligns with the light guide output 118 when the information handling system 100 is in the closed configuration. The embodiment of FIG. 1A discloses one sensor 112. However, multiple sensors 112 may be disposed at any location on the first housing 103 such that the sensors 112 partially align with the light guide output 118 when the information handling system 100 is in the closed configuration.

Figure 5A:
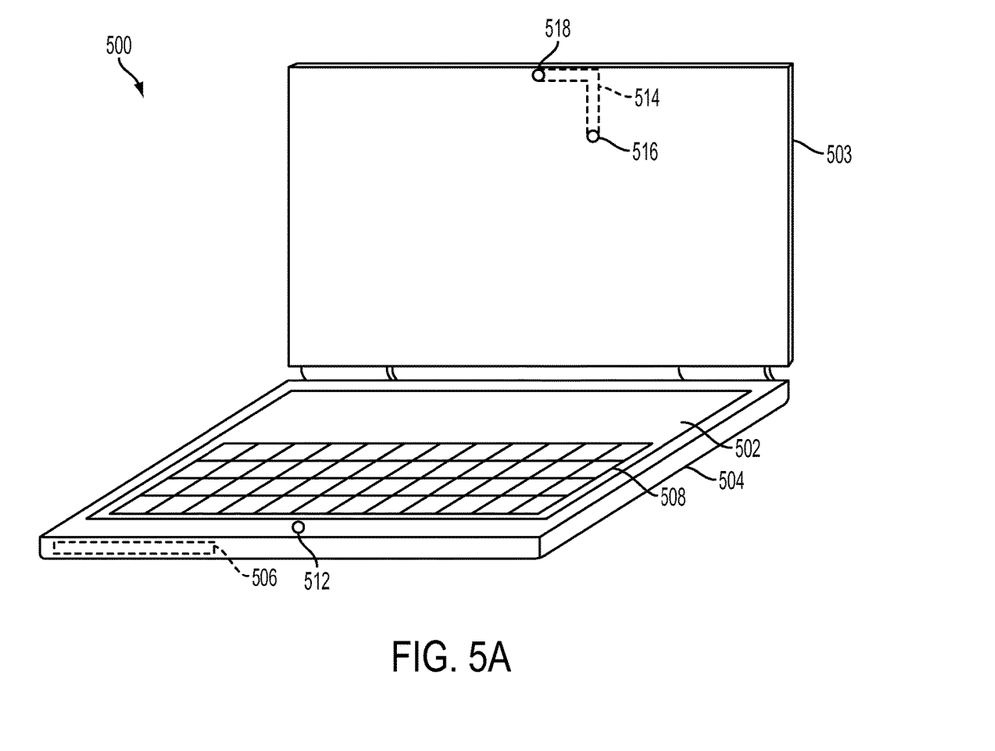
FIG. 5A illustrates an information handling system.

FIG. 5A illustrates an information handling system 500. The information handling system 500 is configured as a portable system and includes a first housing 503 and a second housing 504. The first housing 503 and the second housing 504 are interconnected through a pivot that allows opening and closing of the information handling system 500. In a typical embodiment, the first housing 503 may function as, for example, a lid or a cover of the information handling system 500. The first housing 503 includes a light guide 514 embedded therein. The light guide 514 includes a light guide input 516 and a light guide output 518. The light guide 514 is configured such that, when the information handling system 500 is in a closed configuration, the light guide input 516 faces at least a portion of the display 502 and channels light having display attributes, such as, for example, one or more of color, contrast, saturation, hue, and brightness levels via the light guide 514 to the light guide output 518. In other embodiments, the light guide 514 may be portable and may not be disposed in the first housing 503.

In a typical embodiment, the light guide 514 may be made of, for example, a material having good transmittance in a visible light region, thereby allowing display attributes to be channeled through the light guide 514. For example, the light guide 514 may be made of any material that allows maximum intensity of light rays to pass within the light guide 514. In a typical embodiment, the light guide 514 may be made of, for example, plastic.

The second housing 504 includes a display 502, a sensor 512, and processing circuitry 506 embedded therein. In a typical embodiment, the sensor 512 may be, for example, an ambient light and color sensor. The sensor 512 is configured to measure multiple attributes of the display 502 such as, for example, one or more of color, contrast, brightness, hue, saturation, and other display attributes. In FIG. 5A, the display 502 is a touch-screen display and is configured to display representations of a keyboard 508 (e.g., a virtual keyboard). In a typical embodiment, the display 502 may be any type of visual input/output configured to display one or more characters and/or receive input corresponding to one or more characters. In addition, the display 502 may be configured to display, for example, diagrams, pictures, words, characters, and the like. The display 502 may also be configured to receive input corresponding to one or more diagrams, pictures, words, characters, and the like.

In a typical embodiment, the sensor 512 and the light guide output 518 are configured such that the sensor 512 and the light guide output 518 are partially aligned when the information handling system 500 is in the closed configuration. In the closed configuration, the light guide input 516 faces at least a portion of the display 502 and channels light having display attributes, such as, for example, one or more of color, contrast, saturation, hue, and brightness levels via the light guide 514 to the light guide output 518. When the information handling system 500 is in the closed configuration, the sensor 512 detects and measures light having display attributes from the light guide output 518. For example, the sensor 512 may measure one or more of color, contrast, saturation, hue, and brightness levels of the display 502. The sensor 512 provides adjustment data to the processing circuitry 506 to initiate calibration of the display 502. The calibration of the display 502 is based on the adjustment data from the sensor 512.

Figure 5B:
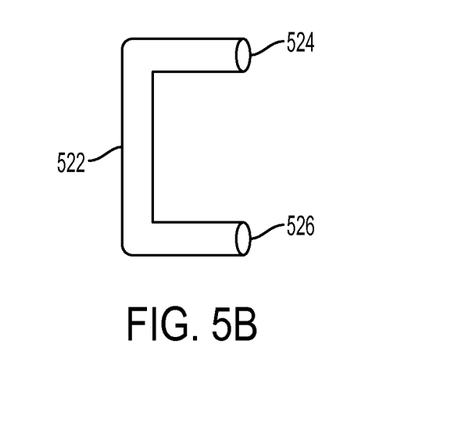
FIG. 5B illustrates a portable light guide.
Figure 5C:
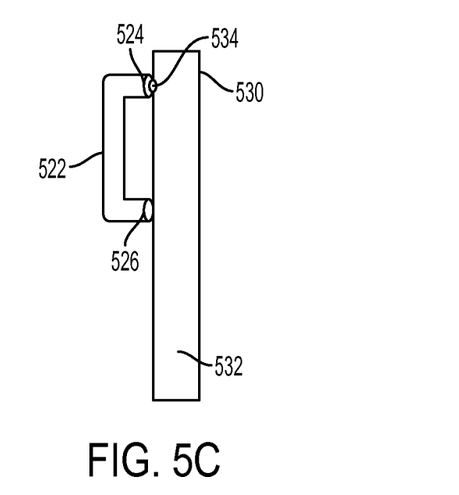
FIG. 5C illustrates the portable light guide in conjunction with an information handling system.

FIG. 5B illustrates a portable light guide 522. FIG. 5C illustrates the portable light guide 522 in conjunction with an information handling system 500. In FIG. 5C, the information handling system 500 is configured as a portable system and includes a single housing 530. In a typical embodiment, the housing 530 includes a display 532 and a sensor 534. In FIG. 5C, the information handling system 500 may be, for example, a tablet computer, a monitor and any other information handling system 500 having a single housing. The portable light guide 522 includes a first opening 524 and a second opening 526. In a typical embodiment, the light guide 522 is generally C-shaped and is made of, for example, a material having good transmittance in the visible light region, thereby allowing light to be channeled through the light guide 522. The portable light guide 522 of FIG. 5B is used for channeling light having display attributes, such as, for example, one or more of color, contrast, saturation, hue, and brightness levels from at least an opening of the first opening 524 and the second opening 526 that faces at least a portion of the display 532 via the light guide 522 to at least a different opening of the first opening 524 and the second opening 526 from the opening that faces at least a portion of the display 532. In a typical embodiment, at least a different opening of the first opening 524 and the second opening 526 from the opening that faces at least a portion of the display 532 is partially aligned with the sensor 534. As such, the sensor 534 is able to measure display attributes from the display 532.

In FIG. 5B, the light guide 522 is portable and may be carried by a user. In other embodiment, the light guide 522 may be stored within a storage slot in the housing 530. As discussed above, relative to FIGS. 1-5A, the sensor 534 may measure, for example, one or more of color, contrast, saturation, hue, and brightness levels of the display 532. The sensor 534 provides adjustment data to processing circuitry to initiate calibration of the display 532. The calibration of the display 532 is based on the adjustment data from the sensor 534. In addition, the intensity of the RGB LEDs is also adjusted based on the adjustment data from the sensor 534.

Figure 6:
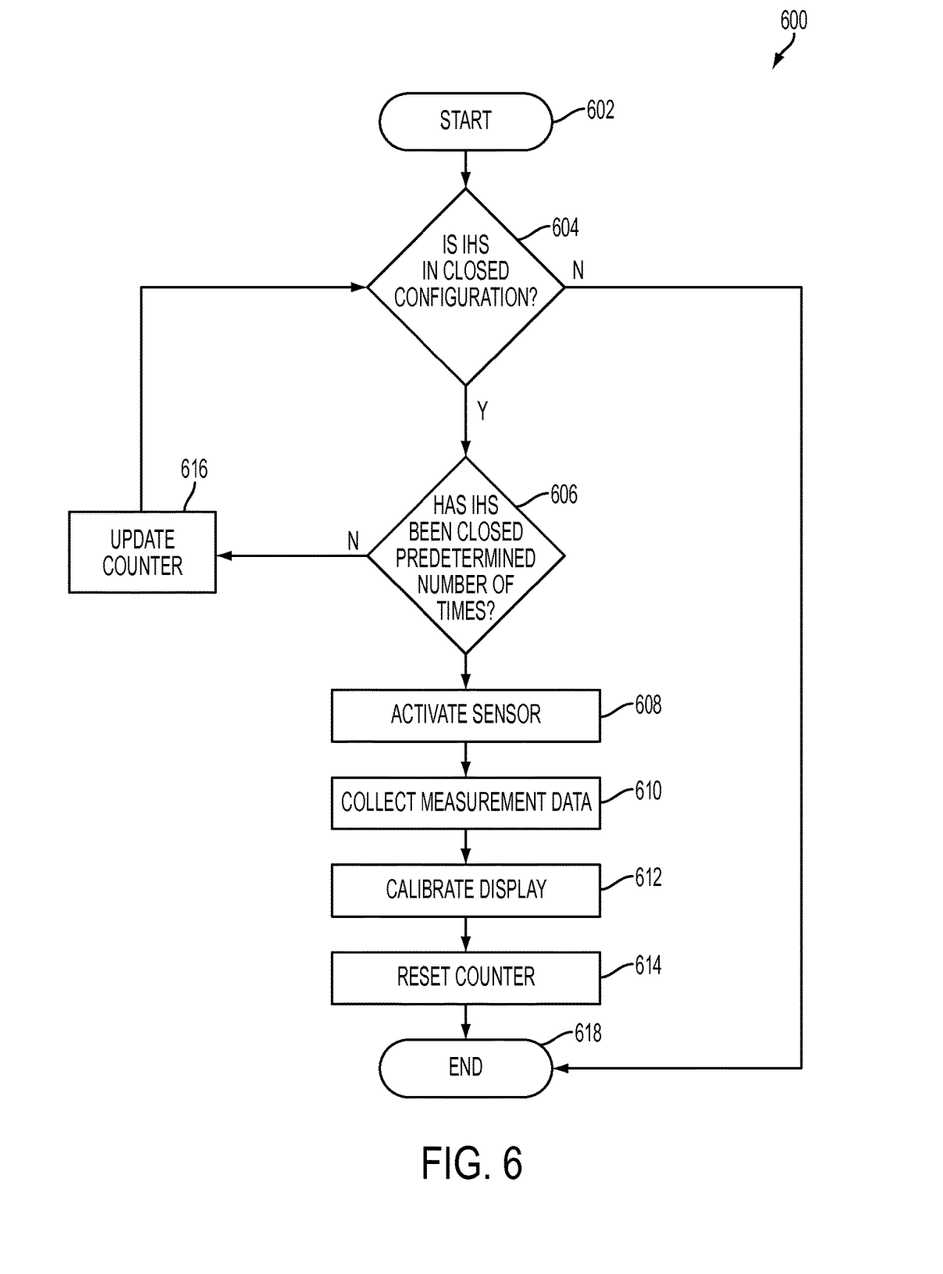
FIG. 6 is a flow illustrating a process for display calibration.

FIG. 6 is a flow illustrating a process 600 for display calibration. For illustrative purposes, the process 600 will be described relative to FIGS. 1-5. The process 600 starts at step 602. At step 604, the processing circuitry 106 determines whether the information handling system 100 is in a closed configuration (e.g., the first housing 103 is closed). If it is determined at step 604 that the information handling system 100 is in the closed configuration, the process 600 proceeds to step 606. However, if it is determined at step 604 that the information handling system 100 is not in the closed configuration, the process 600 ends at step 618.

At step 606, the processing circuitry 106 determines whether a first housing 103 of the information handling system 100 has been closed a predetermined number of times, which may be, for example, one time, two times, three times, four times, five times, six times, and the like. If it is determined at step 606 that the first housing 103 of the information handling system 100 has been closed a predetermined number of times, the process 600 proceeds to step 608. In the closed configuration, a light guide input 116 faces at least a portion of a display 102 and channels light having display attributes, such as, for example, one or more of color, contrast, saturation, hue, and brightness levels via a light guide 114 to a light guide output 118. In addition, when the information handling system 100 is in the closed configuration, the sensor 112 partially aligns with the light guide output 118 and is able to measure light having display attributes 402.

At step 608, an activator 150 activates the sensor 112. In the activated state, the sensor 112 detects and measures light having display attributes of the display 102 (step 610). For example, the sensor 112 may measure, for example, one of more of color, contrast, saturation, hue, and brightness levels of the display 102. At step 612, the sensor 112 provides adjustment data to the processing circuitry 106 to initiate calibration of the display 102. The calibration module 152 performs calibration of the display 102. The calibration of the display 102 is based on the adjustment data from the sensor 112. At step 614, the processing circuitry 106 resets a counter that tracks a number of times the information handling system 100 has been closed. From step 614, the process 600 ends at step 618.

However, if it is determined at step 606 that the first housing 103 of the information handling system 100 has not been closed a predetermined number of times, the process 600 proceeds to step 616. At step 616, the processing circuitry 106 updates the counter that tracks the number of times the information handling system 100 has been closed. From step 616, the process 616 proceeds to step 604. From step 604, the process 600 proceeds either to step 606 or ends at step 618.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchpad touchscreen and/or a video display. The information handling system may also include one or more buses operable to transmit communications between the various hardware components.

It is thus believed that the operation and construction of embodiments of the present invention will be apparent from the foregoing description. While the method and system shown or described have been characterized as being preferred it will be obvious that various changes and modifications may be made therein without departing from the spirit and scope of the invention.

What is claimed is:

1. An information handling system comprising:
   a display housing comprising a display and a sensor;
   an input housing comprising an input device, a light guide and processing circuitry, interoperably coupled to the display housing and movable relative to the display housing between an open configuration and a closed configuration;
   wherein the light guide comprises a plurality of light guide inputs and a light guide output;
   wherein the processing circuitry is configured to process information received via the light guide, the processing circuitry comprising a display-calibration activator;
   wherein the light guide is arranged in the input housing such that the plurality of light guide inputs face multiple regions of the display when the display housing and the input housing are in the closed configuration and channel light having display attributes from the multiple regions of the display to the light guide output; and
   wherein when the display housing and the input housing are in the closed configuration the light guide output extends over and at least partially aligns with the sensor thereby allowing the sensor to receive at least some of the channeled light.

2. The information handling system of claim 1, wherein the sensor forwards adjustment data to the processing circuitry to initiate display calibration.

3. The information handling system of claim 1, wherein the light guide is made of a material having good transmittance in a visible light region.

4. The information handling system of claim 1, wherein the display is a touch-screen display.

5. The information handling system of claim 1, wherein the sensor comprises an ambient light and color sensor.

6. The information handling system of claim 1, wherein the display attributes comprise at least one of a color level, a contrast level, a saturation level, a hue level, and a brightness level of the display.

7. The information handling system of claim 1, wherein the display housing comprises a lid of the information handling system.

8. The information handling system of claim 1, wherein the processing circuitry comprises a calibration module that performs calibration of the display.

9. A method of calibrating a display of an information handling system, the method comprising:
   coupling a display housing with an input housing, wherein the display housing and the input housing are movable between an open configuration and a closed configuration;
   integrating a sensor and a display with the display housing;
   integrating an input device and processing circuitry with the input housing;
   processing, via the processing circuitry, information received via a light guide, the light guide comprising a plurality of light guide inputs and a light guide output;
   wherein the light guide is arranged in the input housing such that the plurality of light guide inputs face multiple regions of the display when the display housing and the input housing are in the closed configuration and channel light having display attributes from the multiple regions of the display to the light guide output; and
   wherein when the display housing and the input housing are in the closed configuration the light guide output extends over and at least partially aligns with the sensor thereby allowing the sensor to receive at least some of the channeled light.

10. The method of claim 9, further comprising forwarding, by the sensor to the processing circuitry, adjustment data to initiate display calibration.

11. The method of claim 10, wherein the processing circuitry is configured to process information received via the light guide.

12. The method of claim 10, wherein the processing circuitry comprises a calibration module that performs calibration of the display.

13. The method of claim 9, wherein the light guide is made of a material having good transmittance in a visible light region.

14. The method of claim 9, wherein the display is a touch-screen display.

15. The method of claim 9, wherein the sensor comprises an ambient light and color sensor.

16. The method of claim 9, wherein the display attributes comprise at least one of a color level, a contrast level, a saturation level, a hue level, and a brightness level of the display.

17. The method of claim 9, wherein the display housing comprises a lid of the information handling system.

18. A display-calibration method comprising:
    disposing a display integrated with a display housing;
    positioning a light guide comprising a plurality of light guide inputs within an input housing comprising an input device and processing circuitry, wherein the input housing is interoperably coupled to the display housing and movable relative to the display housing between an open configuration and a closed configuration of an information handling system;
    wherein the light guide is arranged in the input housing;
    at least partially extending over and aligning with a light guide output of the light guide by a sensor integrated with the display housing;
    the plurality of light guide inputs receiving light having display attributes from multiple regions of the display when the display housing and the input housing are in the closed configuration;
    the light guide channeling at least some of the received light to the light guide output;

the sensor receiving at least some of the channeled light from the light guide output when the display housing and the input housing are in the closed configuration; and forwarding, by the sensor to the processing circuitry, data for use in calibration of the display.

* * * * *